United States Patent [19]

O'Grady et al.

[11] Patent Number: 4,969,041
[45] Date of Patent: Nov. 6, 1990

[54] EMBEDMENT OF DATA IN A VIDEO SIGNAL

[75] Inventors: William J. O'Grady, Yonkers, N.Y.; Robert J. Dubner, Westwood, N.J.

[73] Assignee: Dubner Computer Systems, Inc., Paramus, N.J.

[21] Appl. No.: 248,053

[22] Filed: Sep. 23, 1988

[51] Int. Cl.$^5$ ............................................. H04N 7/08
[52] U.S. Cl. ..................................... 358/142; 358/146
[58] Field of Search .................. 358/84, 86, 141, 142, 358/146; 455/2

[56] References Cited

U.S. PATENT DOCUMENTS 3,838,444 9/1974 Loughlin et al. .................... 358/142
3,984,624 10/1976 Waggener ........................... 358/142

OTHER PUBLICATIONS

Tech. Hochschule Aachen; "Additive Binary Data Transmission in Video Signals"; by Szepanski, NTG--Fachber (Germany), vol. 74, 1980, pp. 343-351.

Primary Examiner—John W. Shepperd
Assistant Examiner—Michael D. Parker
Attorney, Agent, or Firm—Francis I. Gray

[57] ABSTRACT

Data is embedded in a video signal by adding a low level wavefrom to the video signal, the low level wave form having a level below the noise level of the video signal and corresponding to the data. To detect the data embedded in the video signal the video signal is correlated with the low level waveform corresponding to the data to produce a correlation coefficient. A high correlation coefficient indicates the presence of a low level waveform which is converted into the data. The low level waveform extends over many video lines such that it does not occur at or near the same location within a video frame for many video frames to avoid fixed-pattern noise anomalies that may be detected by a viewer of the television picture.

22 Claims, 5 Drawing Sheets

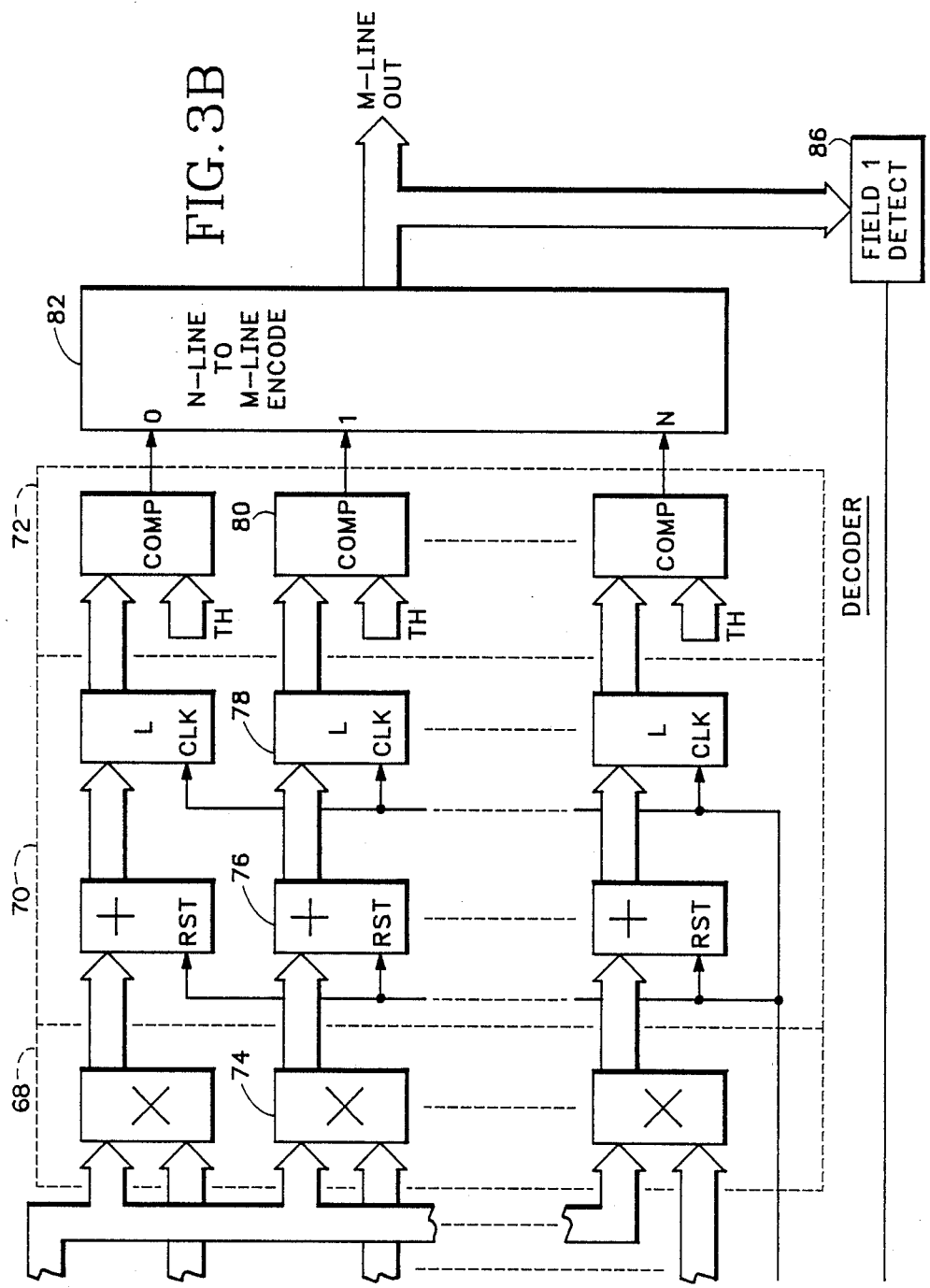

EMBEDMENT OF DATA IN A VIDEO SIGNAL

BACKGROUND OF THE INVENTION

The present invention relates to the transmission of data, and more particularly to the transmission of data unobtrusively embedded in a video signal representing a television program in order to transmit additional information to a receiver of the television program, or to identify the originator of the television program.

A television program is generally broadcast live, or recorded for subsequent broadcasting or distribution to affiliates, licensees or the public on media such as video cassettes. These programs are usually copyrighted or otherwise proprietary to the originator. Unauthorized sale or broadcasting of these programs is difficult to prevent. It is frequently impractical to determine the source of the program that may have been used without permission. Additionally it may be desirable to transmit additional information along with the television program for use by affiliates and licensees.

In either event it would be beneficial to be able to include additional data in the video signal of the television program without interfering with the displayed picture as seen by a viewer. Methods to add information to a video signal without interfering with the viewable picture have concentrated on lines in the vertical interval. However, only a small number of lines are available for this purpose. Also these lines are removed by many pieces of video equipment and replaced with newly generated waveforms containing only synchronizing information. If the purpose of the information is to identify the source of the program, the lines containing additional information could intentionally be replaced so that the source could not be determined.

What is desired is an unobtrusive means for embedding data within the active video portion of a video signal.

SUMMARY OF THE INVENTION

Accordingly the present invention provides for unobtrusively embedding data in a video signal by adding a low level waveform to the video signal during the active video portion of the video signal. The low level waveform may be selected from a plurality of unique waveforms, such as a set of random noise waveforms that are unlikely to occur in a normal video signal, each of which represents a unique digital data word. The low level waveform to be embedded in the video signal has levels significantly below the noise level of the video signal. The low level waveform is detected by correlating the video signal with all of the unique waveforms, or with a desired one of the unique waveforms if a particular data word is sought. The video signal is multiplied by each waveform, or with the desired waveform, and the result is compared with a threshold value to determine a correlation coefficient for each waveform. The correlation coefficient that exceeds the threshold identifies the low level waveform embedded in the video signal. The detected low level waveform may then be converted into a digital word or identifier.

The objects, advantages and other novel features of the present invention are apparent from the following detailed description when read in conjunction with the appended claims and attached drawing.

BRIEF DESCRIPTION OF THE DRAWINGS

FIGS. 3A and 3B are a block diagram of a decoder according to the present invention for detecting one of a plurality of low level waveforms in a video signal.

DESCRIPTION OF THE PREFERRED EMBODIMENT

Figure 1:
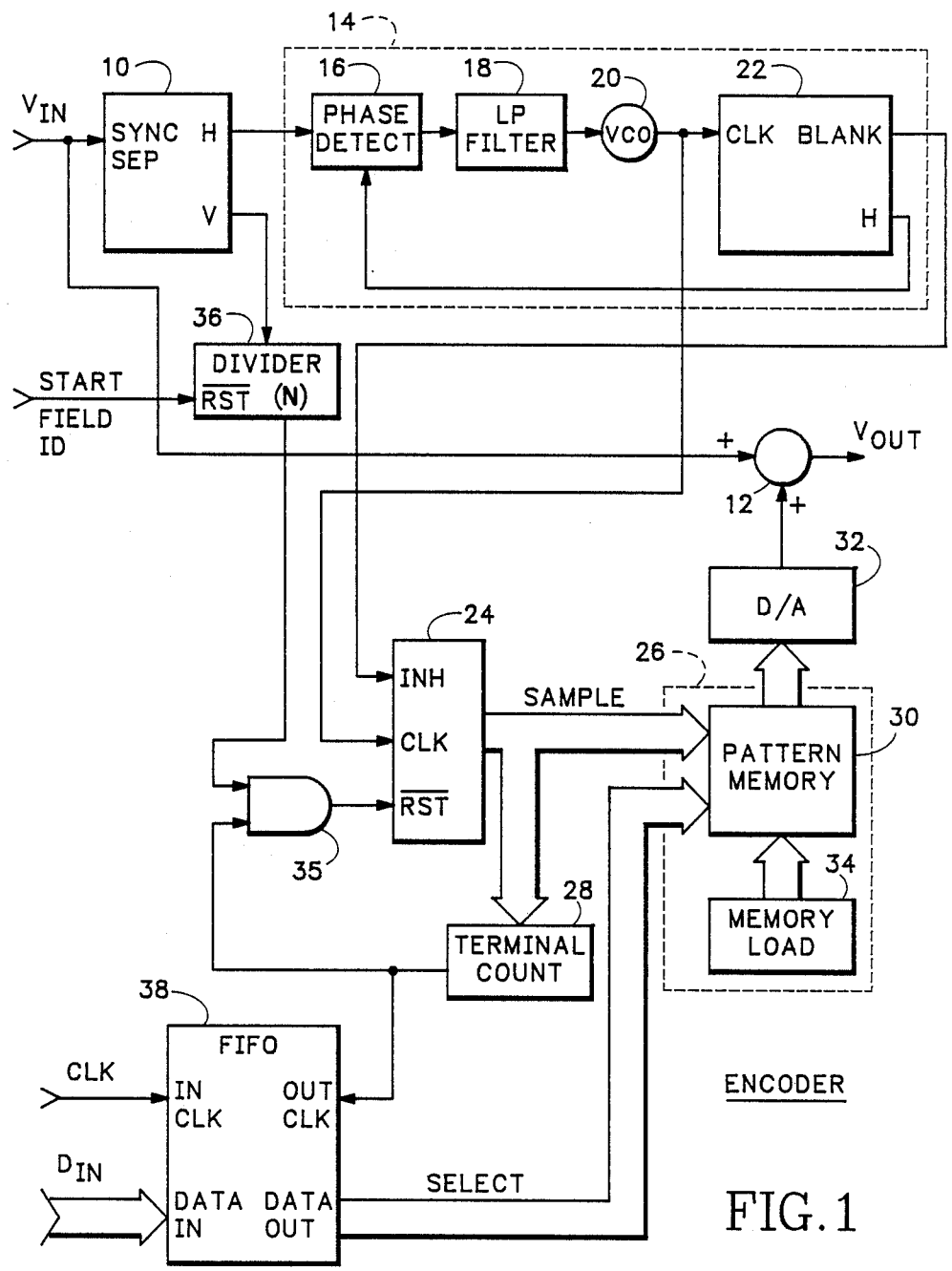
FIG. 1 is a block diagram of an encoder according to the present invention.

Referring now to FIG. 1 an encoder has a video signal, Vin, input to a sync separator 10 and a combiner circuit 12. Horizontal, H, and vertical, V, sync pulses are extracted from the input video signal by the sync separator 10. The H pulses repeat at the video line rate and the V pulses repeat at the video field rate. The H pulses are input to a phase lock loop 14 that synchronizes a sampling frequency to the horizontal sync rate. A phase detector 16 receives the H pulses for comparison with derived H pulses to generate an error signal. The error signal is input via a low pass filter 18 to a voltage controlled oscillator (VCO) 20 having a nominal frequency equal to the sampling frequency. The error signal adjusts the sampling frequency to maintain synchronization with the H pulses from the input video signal.

The sampling frequency from the VCO 20 is input to a blanking counter 22 and an address counter 24. The blanking counter 22 outputs the derived H pulses that are fed back to the phase detector 16 to complete the phase lock loop 14. The blanking counter 22 also provides a blanking signal that is input to the address counter 24. The sampling frequency from the VCO 20 generates addresses from the address counter 24 that are input to a waveform generator 26 and to a terminal count detector 28. The waveform generator 26 has a waveform memory 30 that is addressed sequentially by the addresses from the address counter 24. The data in the memory 30, representing a low level waveform or a plurality of low level waveforms, may be loaded conventionally by a memory load system 34.

The blanking signal from the blanking counter 22 inhibits the address counter 24 from counting the sampling frequency during the inactive portion of the video material, i.e., during the horizontal retrace interval, so that the data is addressed from the memory 30 only during the active line intervals. To prevent fixed-pattern noise that may be detectable by an observer of the resulting television picture even when the waveform level is as low as one-sixth times the noise level of the input video signal, the length of the waveform is chosen so that the period of time before a portion of the waveform appears at or near a location where it previously appeared corresponds to many video frames.

The output from the address counter 24 is input to the terminal count detector 28 for comparison with a predetermined maximum count. The output of the terminal count detector 28 goes low when the terminal count is reached. The terminal signal from the terminal count detector 28 is input to an AND gate 35. Also input to the AND gate 35 is a signal that is output from a vertical sync counter 36. The vertical sync counter 36 is driven by the V pulses from the sync separator 10, and the output of this counter goes low after every n fields of the input video signal. The output of the AND gate 35 resets the address counter 24 after every complete waveform memory cycle and after every n video fields.

Where the purpose of the encoder is to merely add a specified low level waveform as an originator identifier to the input video signal, only one waveform exists within the waveform memory 30. However where information data is to be added to the input video signal, such data, Din, is input to a first-in/first-out (FIFO) buffer 38. Each data word is loaded as a low level waveform into the FIFO buffer 38 in response to an independent input clock signal. The output from the FIFO buffer 38 is input to some of the address lines of the waveform memory 30 as a block or waveform select address. The terminal signal from the terminal count detector 28 serves as an output clock for the FIFO buffer 38 so that the new data word from the buffer addresses the waveform memory 30 each time the terminal count is detected. The output from the address counter 24 provides the addresses to the waveform memory 30 for the selected block or low level waveform as described above. The waveform memory 30 contains in this case all the low level waveforms that may be added to the input video signal. The output from the FIFO buffer 38 determines which low level waveform is added to the input video signal during a data period, and the output from the address counter 24 determines which low level waveform sample is added at any instant in time during the data period. The output from the waveform memory 30 is converted to an analog signal having a level below the noise level of the input video signal by a digital-to-analog convertor 32 for addition to the input video signal by the combiner circuit 12.

To decode the data added to the input video signal a correlation technique is used. The input video signal, $f_v(t)$, is multiplied by each waveform, $f_i(t)$, where i is an integer from one to a predetermined maximum number of waveforms, N. The resulting products are integrated over a time interval, T, equal to the data period to determine a correlation coefficient, CE, for each low level waveform. One correlation coefficient equation that might be implemented is:

$$CE_i = \int_{(To - T)}^{To} f_v(t) \cdot f_i(t) dt.$$

If a low level waveform is present and identical to $f_i(t)$, then it correlates well and the correlation coefficient $CE_i$ for that waveform is high. Since only one low level waveform is sent at a time, the correlation coefficients for all the other waveforms are low.

An alternative correlation coefficient equation is:

$$CE_i = \int_{-\infty}^{To} f_v(t) \cdot f_i(t) \cdot e^{-a(To - T)} dt.$$

Figure 2:
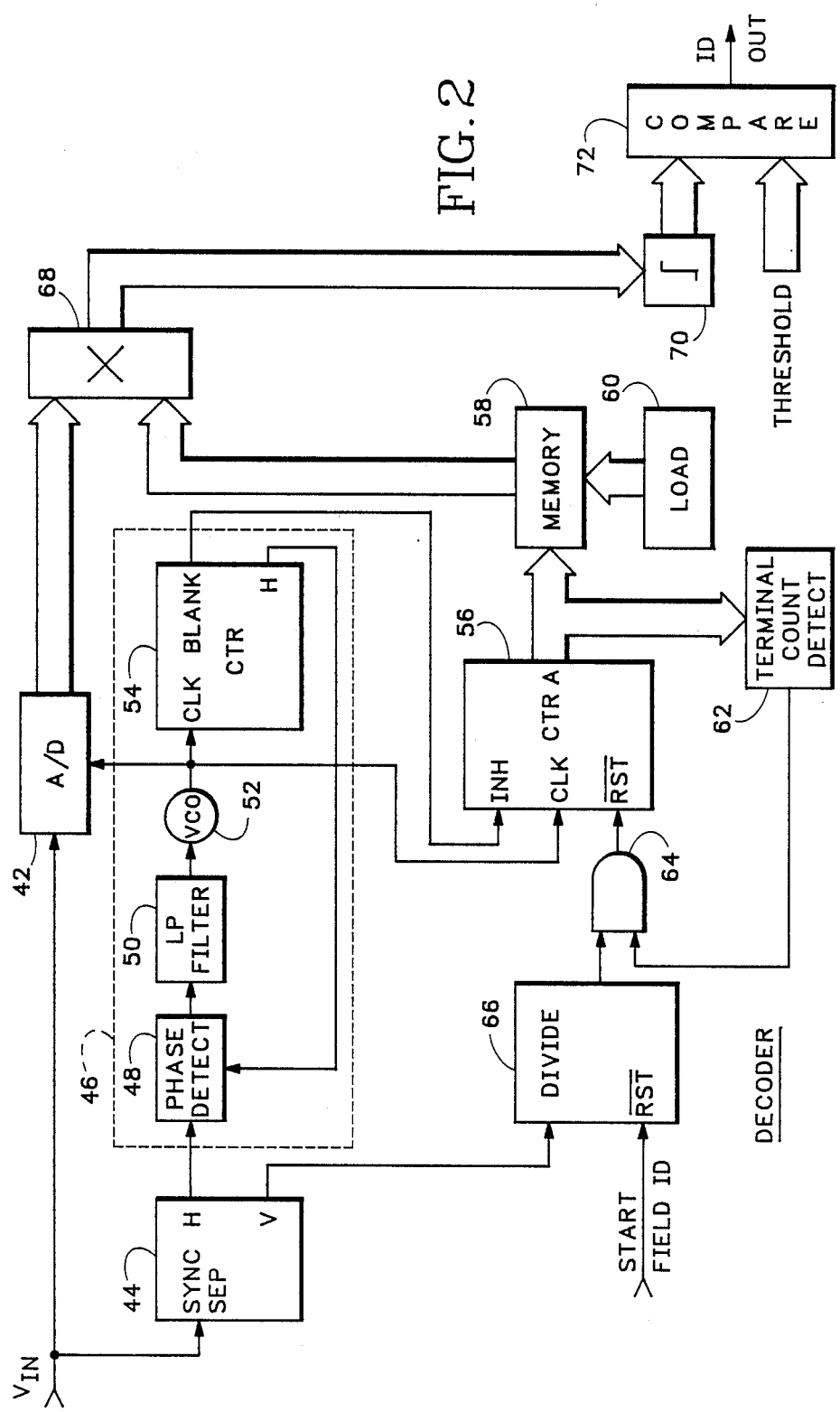
FIG. 2 is a block diagram of a decoder according to the present invention for detecting one specific low level waveform in a video signal.

In the detector circuit of FIG. 2 the video signal with the added data, or originator identifier, is input to an analog-to-digital convertor 42 and a sync separator 44. The output of the sync separator 44 is input to a phase lock loop 46 identical to that in the encoder of FIG. 1, having a phase detector 48, a low pass filter 50, a voltage controlled oscillator (VCO) 52 and a blanking counter 54. The VCO 52 provides the sampling frequency for the A/D convertor 42. Likewise the outputs of the VCO 52 and the blanking counter 54 are input to an address counter 56 that addresses a waveform memory 58 having the desired low level waveform loaded by a memory loader system 60 that corresponds to the originator identifier pattern in the pattern memory 30 of the encoder. The output of the address counter 56 also is input to a terminal count detector 62, the output of which is input to an AND gate 64 together with the output of a divider 66 clocked by the V pulses from the sync separator 44.

The outputs of the analog-to-digital converter 42 and the waveform memory 58 correspond to the two multiplicands of the above equations, and are multiplied together by a digital multiplier 68. The output of the multiplier 68 is input to an integrator 70 for integration over the specified time interval T. The resulting correlation coefficient is input to a comparator 72 together with a threshold correlation value. If the output of the comparator 72 is high, then the originator identifier low level waveform is contained in the video signal. Otherwise the specific identifier is not present.

Figure 3A:
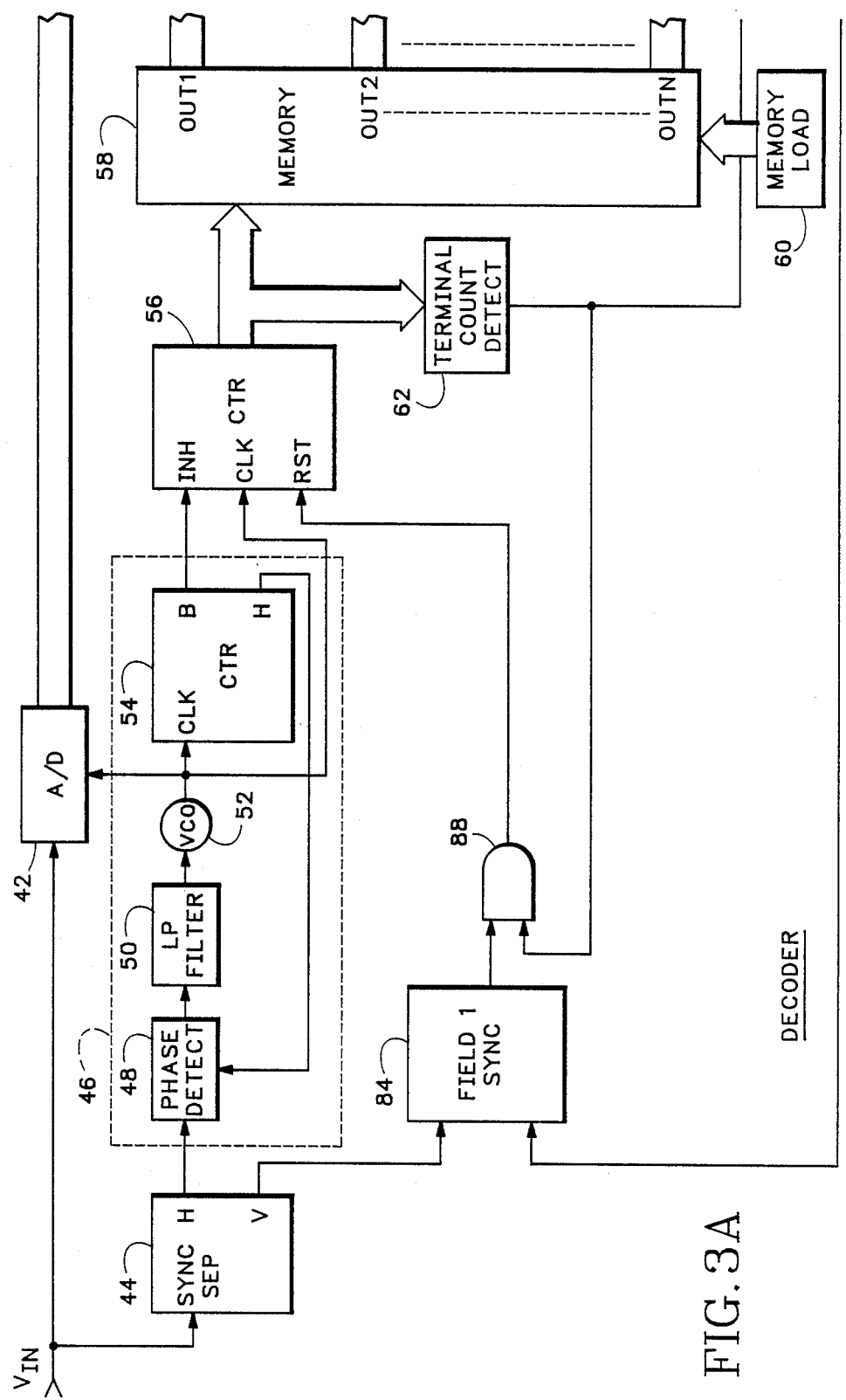

Referring now to FIGS. 3A and 3B a decoder for decoding information data from the video signal is shown. As in the single identifier decoder of FIG. 2 the input video signal with added data is input to both an A/D convertor 42 and a sync separator 44. The H pulses from the sync separator 44 are input to the phase lock loop 46 that provides the sampling frequency for the A/D convertor 42 and for the address counter 56 from the VCO 52. The addresses from the address counter are input to the memory 58, loaded by the memory load system 60 with all the low level waveforms, and the terminal count detector 62. Now however there are N outputs from the memory 58, one for each stored waveform.

The individual waveforms from the memory 58 are input to the multiplier 68 having N individual multipliers 74, one for each pattern. The digitized input video from the A/D converter 42 is input to each of the individual multipliers 74 for combination with each of the waveforms. The outputs of the multipliers 74 are input to the integrator 70 having a channel for each waveform to produce an integrated output for each waveform/video combination. The outputs from the integrator 70 are input to the comparator 72 having a plurality of N individual comparators 80 for each waveform channel, and the outputs of the individual comparators are input to an encoder 82 that converts the N output lines from the comparator 72 into an m-bit digital word corresponding to the particular waveform detected in the video signal during that data period.

As shown in FIG. 3B each integrator 70 may be implemented by an accumulator 76 and a latch 78 connected in series. The outputs of the multipliers 68 are accumulated over a period of time T by the respective accumulators 76. The output of the accumulators 76 are stored in the respective latches 78 at the end of the period of time. The outputs of the latches 78 are then compared by the comparators 72 with the threshold correlation value. The terminal count signal from the terminal count detector 62 serves as a reset signal for the accumulators 76 and as a clock pulse to latch the outputs of the accumulators into the latches 78. The terminal count signal also is applied to the address counter 56 via an AND gate 88 to reset the address counter for the detection of the next data word in the video signal.

A field one synchronizer 84 receives the V pulses from the sync separator 44 and a field one signal from a field one detector 86, where the field one signal is one of the digital data words corresponding to one of the low level waveforms. The field one detector 86 has as an input the output of the N-line to m-line encoder 82 so that, when a field one identifier word is detected, the field one signal is generated. The field one signal is generated periodically during the generation of data, such as once every fifteen frames. If a field one signal is not detected when expected for a given number of intervals, then loss of data sync is determined by the field one synchronizer 84. The synchronizer 84 then provides a reset pulse to AND gate 88 for each V pulse, i.e., at the beginning of each video field, until a field one identifier is found and the field one signal generated. Once the field one signal is generated, the address counter 56 is reset by the terminal count detector 62, and the pulses from the field one detector 86 are redundant unless loss of sync is detected again.

For information data transmission the detector of FIGS. 3A and 3B detects data by testing for the presence of each low level waveform in every data period. For 256 possible distinguishable low level waveforms an eight-bit data word defines which waveform is detected. The duration of the data period is such that a low level waveform does not appear at or near the same place in the picture of the input video signal for several frames by selecting a duration that is not equal to an integral number of lines and by selecting the duration so an integral number of data periods is not equal to a small number of fields. For an input NTSC video signal the VCO sampling frequency may be twice the subcarrier frequency, $2f_{sc}$, with 376 samples per active video line producing 7050 samples per data period equal to 18.75 video lines. If there are 485 active lines in a frame, the address counters 24 and 56 are reset at a fixed location in the raster once every fifteen frames since fifteen frames contain 7275 active lines and 7275 is the smallest integer that is divisible by 18.75 and 485. Since one of 256 possible waveforms is transmitted in a data period, eight bits of input data are transmitted per waveform and 3104 bits are transmitted in fifteen frames equivalent to an approximately six kbaud data rate. The waveform is added well below the noise level of the video signal, such as one-third to one-half times the noise level, so that it is not visible to an observer of the displayed video signal.

Figure 4:
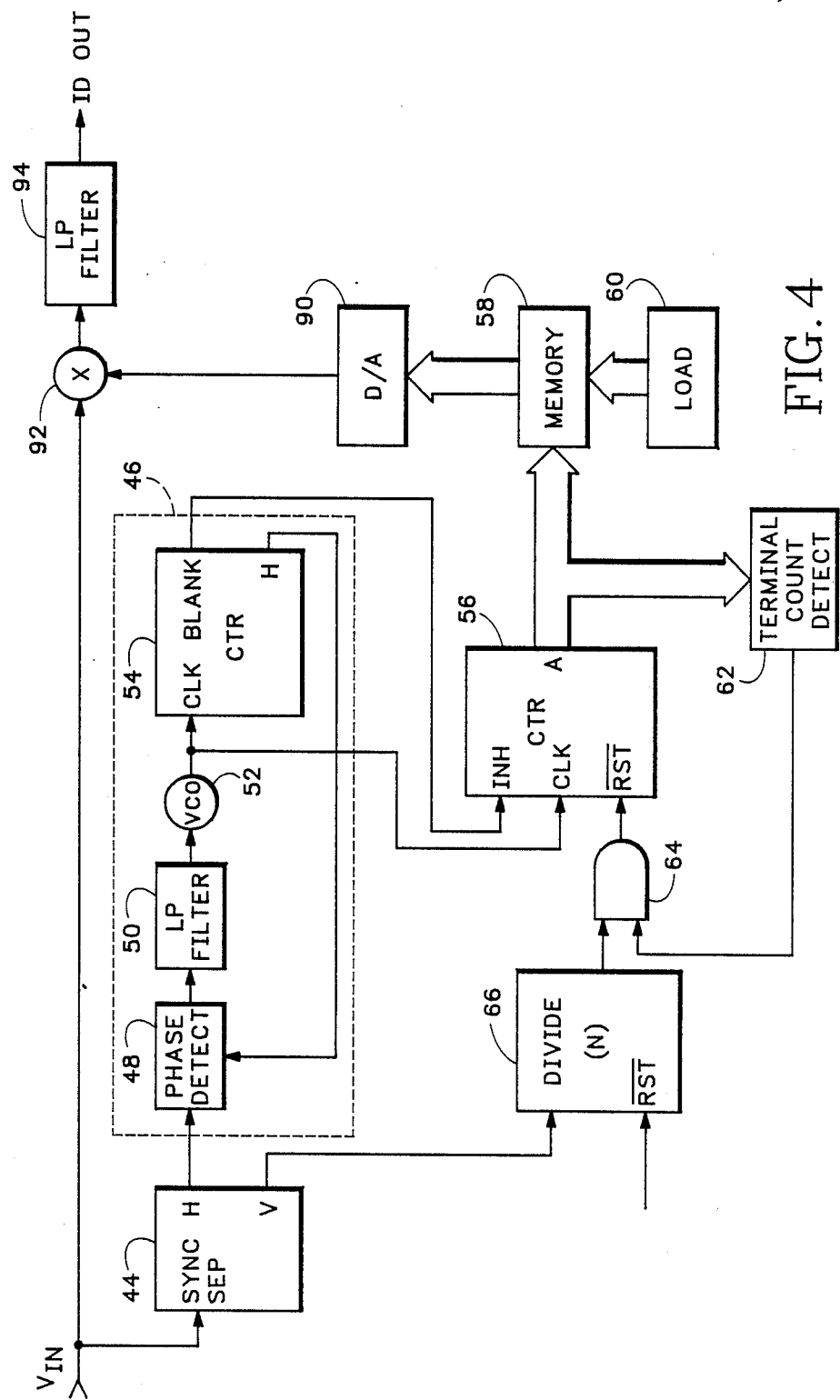
FIG. 4 is a block diagram of an alternate embodiment of the decoder according to the present invention for detecting one specific low level waveform in a video signal.

FIG. 4 represents an alternative embodiment for a decoder implementing the second of the two equations for determining the correlation coefficient for an identifier waveform. Again the detector generates the same low level identifier waveform as that of the encoder of FIG. 1 in the same manner. The identifier waveform from the waveform memory 58 is converted to analog by digital-to-analog converter 90, and then mixed with the input video signal by multiplier 92. The output of the multiplier 92 is input to a low pass filter 94, the output of which indicates whether the identifier waveform is present in the input video signal. The time constant of the low pass filter 94 is equal to several frames of the video input signal.

Thus the present invention provides an unobtrusive method of embedding data in a video signal by adding a unique waveform, corresponding to a digital word or originator identifier, having a level below the noise level of the video signal. The waveform is detected using a correlation technique by which the video signal with the added data is multiplied by each possible waveform, the output digital word or originator identifier corresponding to the waveform having a high correlation coefficient.

What is claimed is:

1. An apparatus for embedding data in a video signal having an active video portion comprising:
   means for generating a low level waveform representing a unique digital data word and having a level below the noise level of the video signal; and
   means for combining the low level waveform with the active video portion in an unobtrusive manner, the low level waveform extending over a plurality of video lines of the video signal in such a manner that it does not occur at or near the same position of a video frame for many video frames to avoid a fixed-pattern anomaly that is detectable by an observer.

2. An apparatus as recited in claim 1 where the generating means comprises:
   means for storing the low level waveform; and
   means for addressing the storing means so that the low level waveform is read out from the storing means for input to the combining means during the active video portion.

3. An apparatus for detecting data embedded in a video signal comprising:
   means for correlating the video signal with a low level waveform corresponding to a unique data word to be detected to produce a correlation coefficient; and
   means for outputting the unique data word when the correlation coefficient is high.

4. An apparatus as recited in claim 3 wherein the correlating means comprises:
   means for multiplying the video signal with the low level waveform; and
   means for integrating the resulting product from the multiplying means over a specified period of time to produce the correlation coefficient.

5. An apparatus as recited in claim 3 wherein the outputting means comprises:
   means for comparing the correlation coefficient with a threshold value so that when the correlation coefficient exceeds the threshold value an identification code corresponding to the low level waveform is produced; and
   means for converting the identification code to the unique data word.

6. A system for transmitting data within a video signal having an active video portion comprising:
   means for unobtrusively embedding in the active video portion a low level waveform corresponding to a unique data word, the low level waveform having a level below the noise level of the video signal and extending over a plurality of video lines of the video signal in such a manner that it does not occur at or near the same position of a video frame for many video frames to avoid a fixed-pattern anomaly that is detectable by an observer; and
   means for detecting the low level waveform within the active video portion to recover the unique data word.

7. A system as recited in claim 6 wherein the embedding means comprises:
   means for generating the low level waveform; and means for combining the low level waveform with the active video portion in an unobtrusive manner.

8. A system as recited in claim 7 wherein the generating means comprises:
means for storing the low level waveform; and
means for addressing the storing means so that the low level waveform is read out from the storing means for input to the combining means during the active video portion.

9. A system as recited in claim 6 wherein the detecting means comprises:
means for correlating the video signal with the low level waveform corresponding to the unique data word to be detected to produce a correlation coefficient; and
means for outputting the unique data word when the correlation coefficient is high.

10. A system as recited in claim 9 wherein the correlating means comprises:
means for multiplying the video signal with the low level waveform; and
means for integrating the resulting product from the multiplying means over a specified period of time to produce the correlation coefficient.

11. A system as recited in claim 9 wherein the outputting means comprises:
means for comparing the correlation coefficient with a threshold value so that when the correlation coefficient exceeds the threshold value an identification code corresponding to the low level waveform is produced; and
means for converting the identification code to the unique data word.

12. A method of embedding data in a video signal having an active video portion comprising the steps of:
generating a low level waveform representing a unique digital data word and having a level below the noise level of the video signal; and
combining the low level waveform with the active video portion in an unobtrusive manner, the low level waveform extending over a plurality of video lines of the video signal in such a manner that it does not occur at or near the same position of a video frame for many video frames to avoid a fixed-pattern anomaly that is detectable by a observer.

13. A method as recited in claim 12 where the generating step comprises the steps of:
storing the low level waveform; and
addressing the stored low level waveform so that the low level waveform is read out for input to the combining step during the active video portion.

14. A method of detecting data embedded in a video signal comprising the steps of:
correlating the video signal with a low level waveform corresponding to a unique data word to be detected to produce a correlation coefficient; and
outputting the unique data word when the correlation coefficient is high.

15. A method as recited in claim 14 wherein the correlating step comprises the steps of:

multiplying the video signal with the low level waveform; and
integrating the resulting produce from the multiplying step over a specified period of time to produce the correlation coefficient.

16. A method as recited in claim 14 wherein the outputting step comprises the steps of:
comparing the correlation coefficient with a threshold value so that when the correlation coefficient exceeds the threshold value an identification code corresponding to the low level waveform is produced; and
converting the identification code to the unique data word.

17. A method of transmitting data within an active portion of a video signal comprising the steps of:
unobtrusively embedding in the active portion a low level waveform corresponding to a unique data word, the low level waveform having a level below the noise level of the video signal and extending over a plurality of video lines of the video signal in such a manner that it does not occur at or near the same position of a video frame for many video frames to avoid a fixed-pattern anomaly that is detectable by an observer; and
detecting the low level waveform within the active portion to recover the unique data word.

18. A method as recited in claim 17 wherein the embedding step comprises the steps of:
generating the low level waveform; and
combining the low level waveform with the active portion in an unobtrusive manner.

19. A method as recited in claim 18 wherein the generating step comprises the steps of:
storing the low level waveform; and
addressing the stored low level waveform so that the low level waveform is read out for input to the combining step during the active portion.

20. A method as recited in claim 17 wherein the detecting step comprises the steps of:
correlating the video signal with the low level waveform corresponding to the unique data word to be detected to produce a correlation coefficient; and
outputting the unique data word when the correlation coefficient is high.

21. A method as recited in claim 20 wherein the correlating step comprises the steps of:
multiplying the video signal with the low level waveform; and
integrating the resulting product from the multiplying step over a specified period of time to produce the correlation coefficient.

22. A method as recited in claim 20 wherein the outputting step comprises the steps of:
comparing the correlation coefficient with a threshold value so that when the correlation coefficient exceeds the threshold value an identification code corresponding to the low level waveform is produced; and
converting the identification code to the unique data word.

* * * * *